US010354473B2

(12) United States Patent
Smith et al.

(10) Patent No.: US 10,354,473 B2
(45) Date of Patent: Jul. 16, 2019

(54) NOTE VERIFY

(71) Applicant: FireKing Security Products, LLC, New Albany, IN (US)

(72) Inventors: Michael J. Smith, Scottsburg, IN (US); Kevin Wanke, Salem, IN (US); John Rhoads, Argyle, TX (US)

(73) Assignee: FireKing Security Products, LLC, New Albany, IN (US)

(*) Notice: Subject to any disclaimer, the term of this patent is extended or adjusted under 35 U.S.C. 154(b) by 393 days.

(21) Appl. No.: 14/532,145

(22) Filed: Nov. 4, 2014

(65) Prior Publication Data

US 2016/0125374 A1   May 5, 2016

(51) Int. Cl.
| | |
|---|---|
| *G07D 11/00* | (2019.01) |
| *G07D 11/22* | (2019.01) |
| *G06Q 20/10* | (2012.01) |
| *G07D 11/16* | (2019.01) |
| *G07D 11/40* | (2019.01) |
| *G07D 11/50* | (2019.01) |
| *G07D 11/125* | (2019.01) |

(52) U.S. Cl.
CPC ......... *G07D 11/22* (2019.01); *G06Q 20/1085* (2013.01); *G07D 11/009* (2013.01); *G07D 11/125* (2019.01); *G07D 11/16* (2019.01); *G07D 11/40* (2019.01); *G07D 11/50* (2019.01)

(58) Field of Classification Search
CPC ............ G07D 11/009; G07D 11/0093; G07D 11/0096; G07D 11/16; G07D 11/22; G07D 11/40; G07D 11/50; G07D 11/125; G06Q 10/06; G06Q 20/10; G06Q 20/08; G06Q 40/02; G06Q 20/1085; Y10S 902/08; Y10S 902/00; G06K 2017/0038; G06K 7/10415

USPC ............... 194/206, 207, 344, 351; 209/534; 235/379; 705/35, 39–45
See application file for complete search history.

(56) References Cited

U.S. PATENT DOCUMENTS

| | | | | |
|---|---|---|---|---|
| 5,316,117 A | * | 5/1994 | Griner ...................... | G07F 7/04 194/203 |
| 5,695,038 A | * | 12/1997 | Keith, III .................. | G07F 9/06 194/206 |
| 5,813,510 A | * | 9/1998 | Rademacher ............ | G07D 1/04 194/206 |
| 5,918,720 A | * | 7/1999 | Robinson ........... | G07D 11/0093 194/206 |
| 5,944,163 A | * | 8/1999 | Keith, III .................. | G07F 9/06 194/206 |
| 5,975,275 A | * | 11/1999 | Keith, III .................. | G07F 9/06 194/217 |
| 6,055,521 A | * | 4/2000 | Ramsey ................. | G06Q 50/06 222/2 |
| 7,063,252 B2 | * | 6/2006 | Smith .................. | G06Q 20/102 235/379 |

(Continued)

OTHER PUBLICATIONS

Fireking Summit Series User's Guide (Year: 2018).*

*Primary Examiner* — Jeffrey A Shapiro
(74) *Attorney, Agent, or Firm* — Great Lakes Intellectual Property, PLLC

(57) ABSTRACT

A validator having multiple modes of operation is contemplated. The validator may be operable in a standard mode where notes are escrowed and subsequently directed to a secure storage area depending on validity and a note-verify mode where notes are escrowed and subsequently returned to a user regardless of validity.

17 Claims, 5 Drawing Sheets

(56) References Cited

U.S. PATENT DOCUMENTS

| | | | | |
|---|---|---|---|---|
| 7,264,150 B1* | 9/2007 | Moreland | E05G 7/001 | 194/206 |
| 8,794,420 B1* | 8/2014 | Smith | G07D 11/009 | 194/350 |
| 9,183,692 B2* | 11/2015 | Smith | G07D 11/0093 | |
| 9,214,049 B2* | 12/2015 | Doi | G07D 1/00 | |
| 9,390,594 B2* | 7/2016 | Levenick | G07F 19/202 | |
| 2002/0056605 A1* | 5/2002 | Mazur | C12Q 1/37 | 194/207 |
| 2002/0100399 A1* | 8/2002 | Young | G07D 11/0009 | 109/24.1 |
| 2003/0014370 A1* | 1/2003 | Charrin | G06Q 20/367 | 705/65 |
| 2009/0056599 A1* | 3/2009 | Turner | E05B 63/143 | 109/2 |
| 2009/0223777 A1* | 9/2009 | Matsuura | G07D 11/0084 | 194/216 |
| 2010/0198708 A1* | 8/2010 | Tabachnik | G07D 1/02 | 705/30 |
| 2011/0246278 A1* | 10/2011 | Kubo | G06Q 20/042 | 705/14.25 |
| 2011/0279225 A1* | 11/2011 | Frontino | G07D 11/0066 | 340/5.3 |
| 2012/0073482 A1* | 3/2012 | Meeker | E05G 1/00 | 109/23 |
| 2012/0158588 A1* | 6/2012 | Kubo | G06Q 20/40 | 705/44 |
| 2012/0186199 A1* | 7/2012 | Rao | G07D 11/0069 | 53/467 |
| 2012/0305362 A1* | 12/2012 | Iwamura | B65H 29/006 | 194/206 |
| 2013/0054391 A1* | 2/2013 | Hipolito | G06Q 20/20 | 705/17 |
| 2013/0082822 A1* | 4/2013 | Levenick | G07F 19/202 | 340/5.73 |
| 2013/0213763 A1* | 8/2013 | Rao | G07D 11/0069 | 194/350 |
| 2014/0238815 A1* | 8/2014 | Iwamura | G07F 7/04 | 194/206 |
| 2014/0290539 A1* | 10/2014 | Tagashira | G07G 1/14 | 109/53 |
| 2014/0332339 A1* | 11/2014 | Crist | G07F 19/203 | 194/206 |
| 2015/0096865 A1* | 4/2015 | Smith | G07D 11/0093 | 194/206 |

* cited by examiner

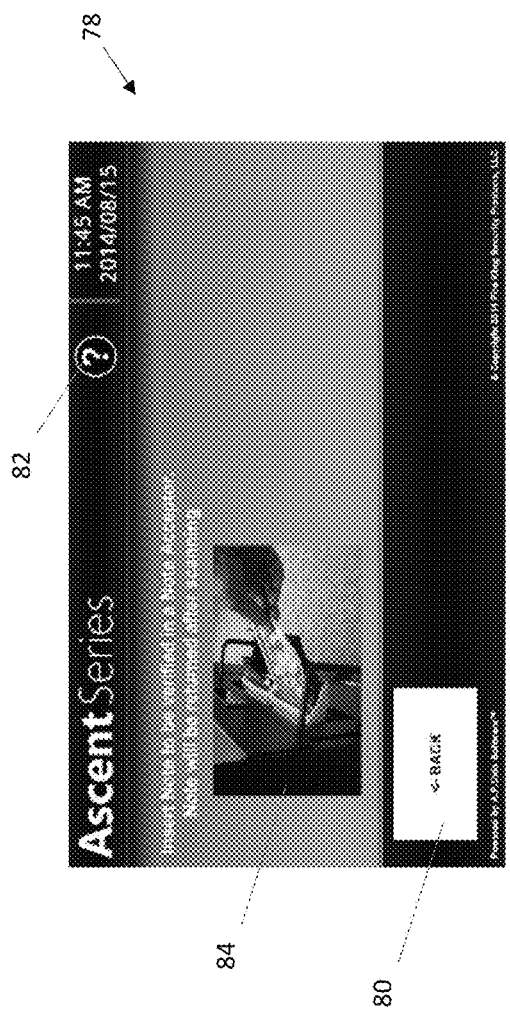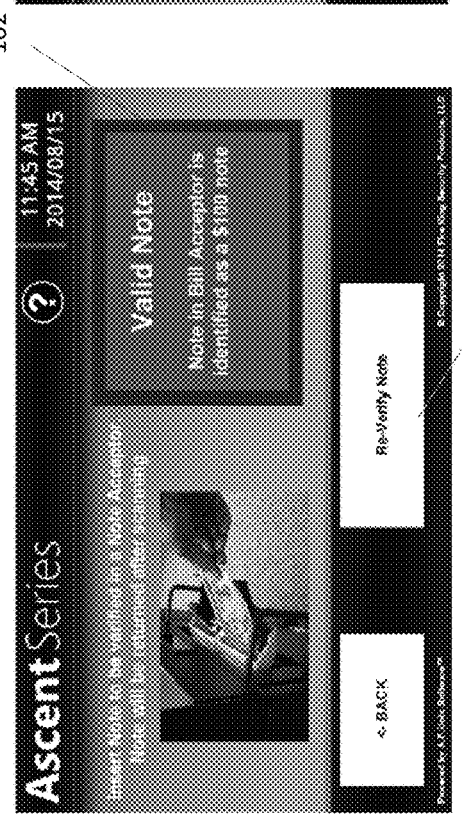
Fig. 4
Fig. 5
Fig. 6

NOTE VERIFY

TECHNICAL FIELD

The present invention relates to verifying notes, such as but not necessarily limited to circumventing standard mode operations to permit a note-verify mode where verification is performed prior to return of the note.

BACKGROUND

Safes, automated teller machines (ATMs), vending machines, video gaming units and other devices may receive bank notes, coins, paper money or other valuables for safekeeping. More and more of these secure storage apparatuses are being manufactured with various electronically controllable operations, including capabilities to verify notes prior to storage. U.S. Pat. Nos. 5,918,720, 7,063,252 and 8,794,420 and U.S. patent application Ser. Nos. 13/248,000, 13/648,503 and 14/046,764, the disclosures of which are hereby incorporated by reference in their entireties, describe safes having such electronically controllable operations, amongst others.

BRIEF DESCRIPTION OF THE DRAWINGS

FIG. 4 illustrates an idle screen in accordance with one non-limiting aspect of the present invention.

FIG. 5 illustrates a valid screen in accordance with one non-limiting aspect of the present invention.

FIG. 6 illustrates an invalid screen in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
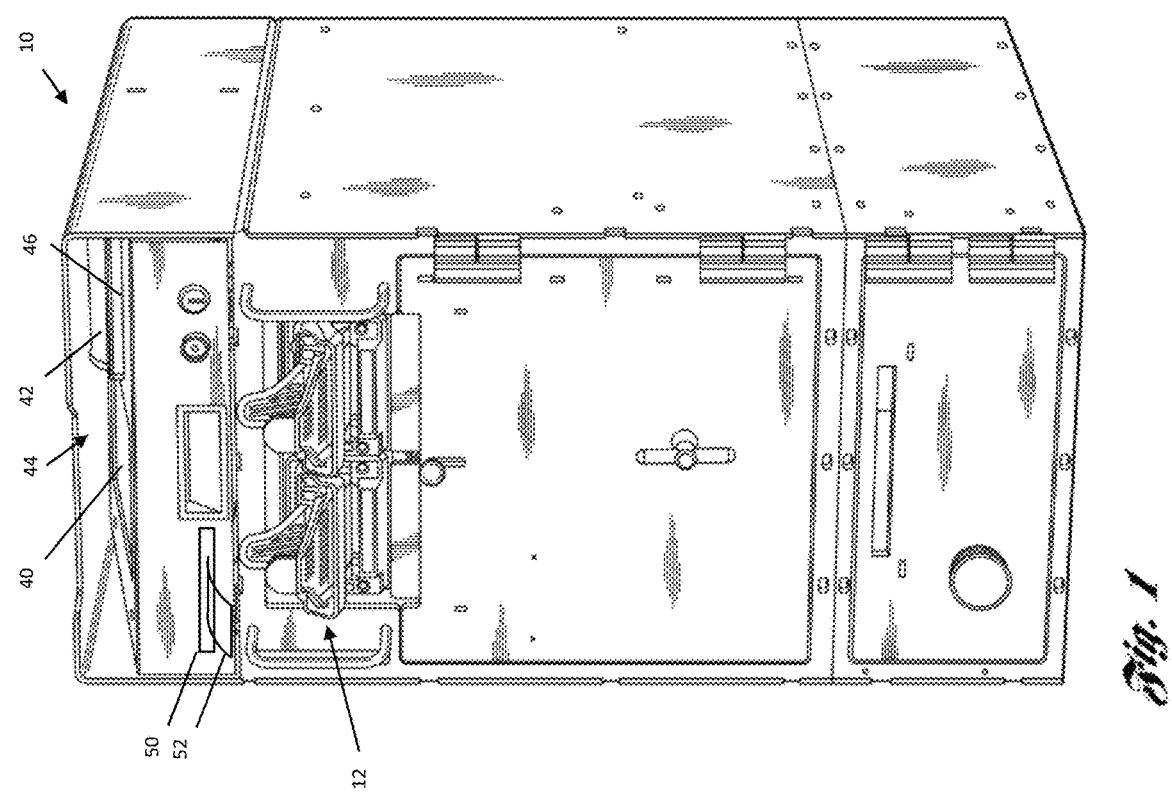
FIG. 1 illustrates a secure storage apparatus in accordance with non-limiting aspect of the present invention.
Figure 2:
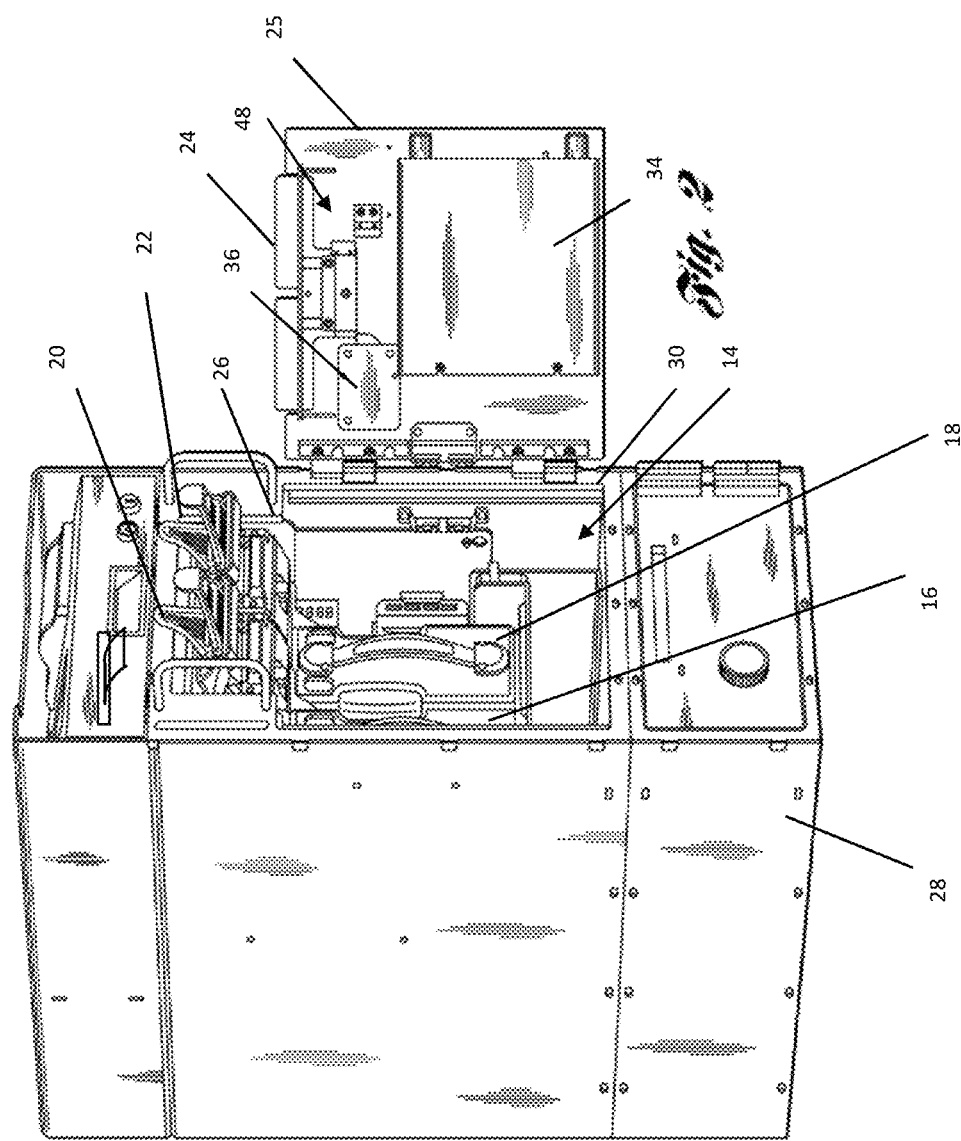
FIG. 2 illustrates an interior storage location of the secure storage apparatus as contemplated by one non-limiting aspect of the present invention.

FIG. 1 illustrates a secure storage apparatus 10 in accordance with non-limiting aspect of the present invention. The secure storage apparatus 10 corresponds with that described in U.S. patent application Ser. No. 13/752,686 and may be configured to facilitate safekeeping of deposits, such as but not necessarily limited to deposits in the form of coins, paper currency, bills, documents, letters, boxes or other items that may be electro-mechanically delivered through an exterior input for safekeeping within an interior storage location. The secure storage apparatus 10 is predominately described with respect to being configured as a safe having a sorter 12 configured as a bill validator operable to receive and process paper currency for safekeeping, however other similar configurations may be used without deviating from the scope and contemplation of the present invention (e.g., vending machines, automated teller machines (ATMs), video game machines, etc.). FIG. 2 illustrates an interior storage location 14 of the secure storage apparatus 10 as contemplated by one non-limiting aspect of the present invention. The interior storage location 14 is shown to include a first cassette 16 and a second cassette 18 operable with a first head 20 and a second head 22 of the bill validator 12 to facilitate processing and safe storage of paper currency. The secure storage apparatus 10 may be configured to facilitate servicing of the bill validator 12 while maintaining security of the currency kept within the first and second storage cassettes 16, 18.

The apparatus 10 may include a shutter 24 mounted or otherwise affixed to a door 25 to permit servicing of the bill validator 12 while maintaining security of the stored items. The shutter 24 may be movable positionable relative to a first opening 26 in a substantially enclosed housing 28 forming a body of the apparatus 10. The first opening 26 may be sufficiently shaped within a side of the housing 28 to permit removal of the bill validator 12, one or more of the bill validator heads 20, 22 or other component of the validator 12, therethrough. The door 25 may be movable positioned relative to a second opening 30 in the side of the housing 28. The second opening 30 may be shaped to permit removal of the cassettes 16, 18 or other storage container configured to receive the deposit therethrough. The shutter 24 may be movable positioned between a closed position and an opened position to respectively prevent and permit removal of the bill validator. The door 25 may be movable between a closed position (see FIG. 1) and an opened position (see FIG. 2) to respectively prevent and permit removal of the storage cassette 16, 18. The shutter 24 may be configured in accordance with the present invention to permit removal of the bill validator 12 while the door 25 is in the closed position, thereby enabling servicing of the bill validator 12 without compromising security of the deposited items.

A door lock 34 may be included to lock the door 25 to the housing independently of a shutter lock 36. (While shown on the door, the door lock need not be included on the door may and may be positioned elsewhere to secure the door when in the closed position.) Like the shutter lock 36, the door lock 34 may be an electronically operable lock operable between a locked state and an unlocked state in response to messages and/or electronic signal. The door lock 34 is shown to include two bars that extend into a wall of the housing 28 when in the locked state to lock the door 25 in the closed position and that retract when in the unlocked state to permit opening of the door 25. The door lock 34 may be separately controllable from the shutter lock 44 such that individuals having capabilities to open the shutter 24 may not necessarily have capabilities to open the door 25. A human-machine interface (HMI), touch-screen, display or other interface 40 (see FIG. 1) may be included to facilitate electronically controlling various operations of the safe, including but not limited to the shutter lock 36 and/or the door lock 34, such as through user inputs thereto. A card reader 42 may also be included to read a secure card or magnetic strip configured to facilitate input of a code or other identifier needed to control one or both of the locks. The HMI 40 and/or card reader 42 may be housed below a top side of the housing 28 within a cavity 44. A pull-out tray 46 may be extended to position the HMI 40 and/or card reader 42 outboard of the housing 28.

The HMI 40 may include a network interface (not shown) sufficient to facilitate remote control and networking of the apparatus 10 and the housing 28 may be enclosed in a sleeve (not shown), such as in the manner described in U.S. patent application Ser. No. 13/648,503, the disclosure of which is hereby incorporated by reference in its entirety, and the applications and patents noted above. A switch 48 may be included to facilitate electronically controlling the shutter lock 44. The switch 48 may be a magnetic switch operable to indicate whether the shutter 24 is in one of the closed position and the opened position depending on whether a first magnet mounted to the shutter 24 is aligned with a second magnet mounted to the door 25. The magnetic switch 48 may be configured to facilitate closing a circuit to indicate the shutter 24 being in the opened position when the first magnet aligns with the second magnet and to facilitate breaking the circuit to indicate the shutter 24 being in the closed position when the first magnet is misaligned with the second magnet. While not shown, wires may extend from the shutter lock 36, the door lock 34 and/or the switch 48 to facilitate electronic communications therewith and/or these components may include wireless communication capabilities. A printer 50, such as but not necessarily limited to a thermal printer, may be configured, such as with a printing element and a paper feed system, to facilitate printing receipts 52. The printer 50 is shown to be on the face the pullout tray but may be positioned elsewhere, such as on a top of the tray next to the HMI 40 in order to provide a closer proximately and ease of use when interacting therewith.

Figure 3:
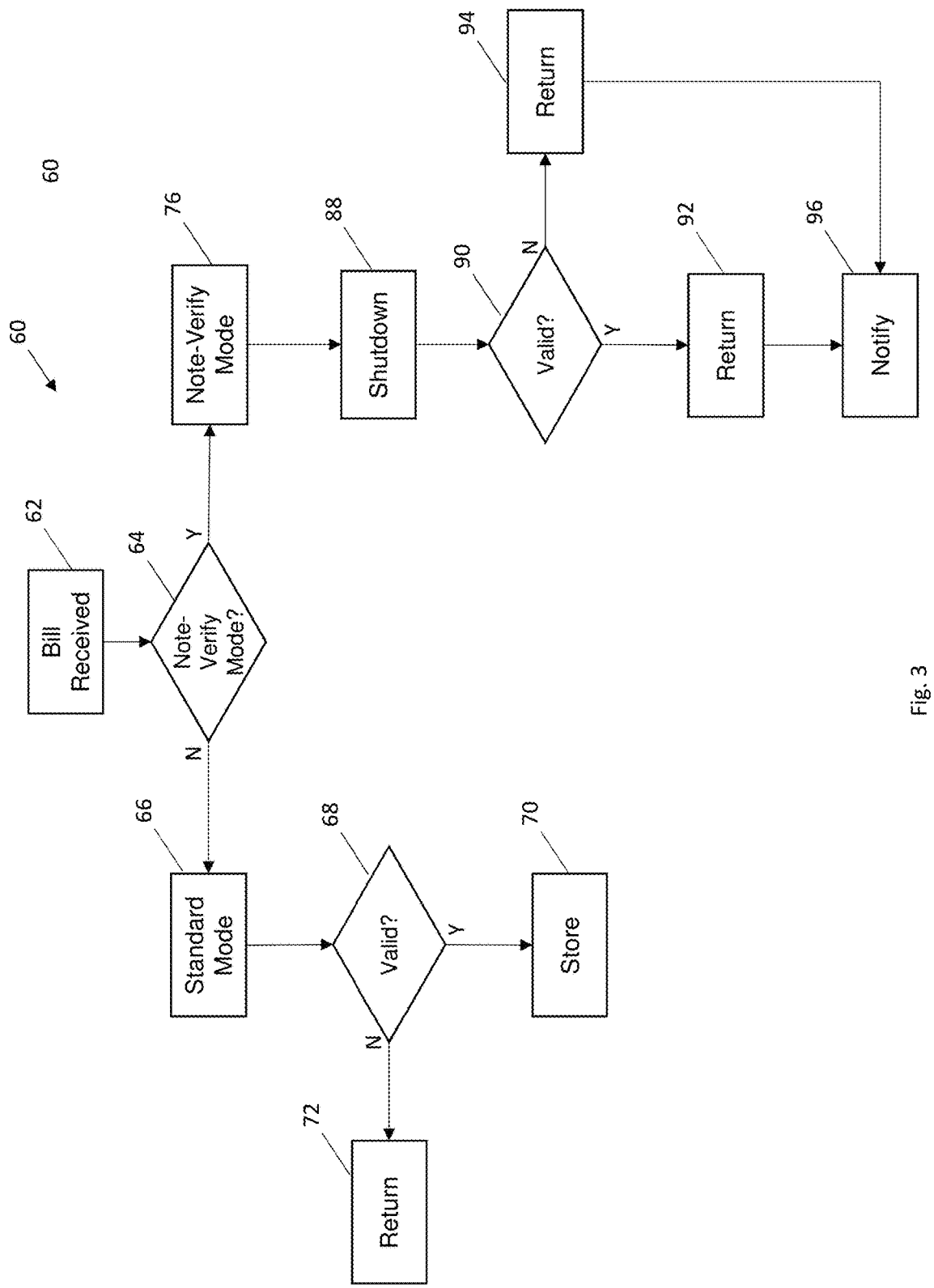
FIG. 3 illustrates a flowchart of a verification process in accordance with one non-limiting aspect of the present invention.

FIG. 3 illustrates a flowchart 60 of a verification method in accordance with one non-limiting aspect of the present invention. The method may be embodied in a computer-readable medium having non-transitory instructions operable with a processor to facilitate verifying notes, such as but not necessary limited to verifying currency, bills, checks, or other material capable of being fed through the validator 12. The safe 10, validator 12 or a centralized network controller, such as the one described in U.S. Pat. No. 7,063,252, the disclosure of which is hereby incorporated by reference in its entirety herein, may be operable in accordance with the flowchart to facilitate some or all of the operations and/or processes associated with the contemplated verification method. The verification method is predominately described for non-limiting purposes with respect to the validator 12 being configured to escrow currency notes for verification, such as to determine whether the notes are valid or invalid or to generate other information as a function thereof, e.g., to generate audit reports, values, etc. The validator 12 may be removable validator, such as the one described in U.S. Pat. No. 8,348,043, the disclosure of which is incorporated by reference in its entirety herein, or any other type of validator having capabilities sufficient to facilitate the verification process contemplated herein.

Block 62 relates to verification process beginning with one or more notes being fed into the validator 12. While the validator 12 shown in FIG. 2 includes first and second mechanisms 20, 22 operable to facilitate simultaneously verifying notes fed thereto, the present invention fully contemplates the safe 12 or other device having the validator 12 being configured with a single validator mechanism and/or additional validator mechanisms. The present invention may also be operable in a networked environment having multiple validators connected to a centralized network controller operable to monitor, control and otherwise manipulate or control operations of multiple validators 12 and/or safes 10. The verification method may be particularly beneficial when a need arises to verify a note prior to accepting it as payment in a point-of-sale (POS) system where a cashier (user) keeps money in a till for the purposes of recording sales and making change with customer, e.g., to verify authenticity of a $100 bill prior to accepting it as tender for a transaction. In this exemplary use case, the cashier may feed the $100 bill to the validator 12 in a manual operation but the present invention would be equally useful in an automated process.

Block 64 relates to determining whether the validator 12 has been programmed to operate in a standard mode or a note-verify mode. The standard mode may correspond with typical or normal operation where the validator 12 is being used to verify and process submitted notes for storage within the secure storage area 14. The note-verify mode may correspond with a non-typical or temporary mode of operation where the validator 12 is being used to verify and process submitted notes for the purposes of returning it to the cashier rather than storing it in the secure storage area 14. While only the standard and note-verify modes are described, the present invention fully contemplates the safe 10 or other device having the validator 12 being operable in any number of additional operational modes. The determination of whether the validator 12 is operating in the standard mode or the note-verify mode may be based on control signals or user inputs thereto. The HMI 40 may be operable to display a button sufficient for switching between the standard and note-verify modes. One non-limiting aspect of the present invention contemplates a scenario where the cashier instigates a single manipulation of a mode-switch button included on the HMI 40 to switch from the standard mode to the note-verify mode and/or from the note-verify mode back to the standard mode. Optionally, a timer or other default control may be implemented to automatically revert from the note-verify mode back to the standard mode.

Block 66 relates to the standard mode being currently active upon receipt of the note. The validator 12 may include a sensor or other feature capable of sensing presence of the bill prior to beginning a feed-in/escrow process so as to facilitate determining presence of the note prior to the note being mechanics driven into the validator 12. Block 68 relates to the validator 12 performing a verification process where the note is determined to be valid or invalid. A valid determination may occur when the node is determined to be genuine and an invalid determination may occur when the note is determined to be fake or incapable of being scanned/process for the purposes of assessing validity, e.g., in the event the note distorted, ripped or otherwise defective. The valid and invalid determinations are described for exemplary non-limiting purposes as illustrative of various operations capable of being performed with the bill validator 12 to adjudicate or otherwise assess the received note. Additional operations and/or processes may be performed in the standard mode and/or the note-verify mode without deviating from the scope and contemplation of the present invention. The verification process may include the note being escrowed entirely within the validator 12 such that it is out-of-sight of the user or otherwise entirely lodged within the validator 12, such as to enable a scanner or other device to assess authenticity.

Block 72 relates to the validator 12 facilitating delivery of a note determined to be valid for safekeeping. Block 74 relates to the validator 12 returning a note determined to be invalid. The validator 12 may include a first interface through which a user feeds the note and a second, different interface through which the note may be delivered for storage such that returned notes may be delivered back through the first interface and accepted notes may be delivered through the second interface. At the conclusion of the verification process, an audit report or other information may be generated by the validator 12 and/or information may be provided from the validator 12 to a controller for use in monitoring the corresponding transaction. The exemplary description of the standard mode may include any number of other operations and processes to be performed by the validator 12 or other device associated with the safe 10. The standard mode may be generally characterized by an intention to keep or otherwise prevent return of the submitted note to the user if found to be valid, authenticated or otherwise suitable for safekeeping. While described with respect to keeping valid notes, the notes may also be retained or kept even if found to be invalid, such as to prevent its continued circulation.

Block 76 relates to determining to the note-verify mode being currently active upon receipt of the note. FIG. 4 illustrates an idle screen 78 appearing within the HMI 40 of other display associated with the safe 10, such as display included on the cash register or in a location common to multiple cashiers, according to the note-verify mode in accordance with one non-limiting aspect of the present invention. The idle screen 78 is shown to include a button 80 for returning to a home page (not shown) or to switch back to the standard mode, a help button 82 for viewing/printing instructions, such as in the manner described in Ser. No. 14/046,764, the disclosure of which is hereby incorporated by reference in its entirety herein, and an instructive illustration 84 directing the user to insert the note to the validator 12. In the event a display is viewable to multiple cashiers or users, the idle screen 78 may act as an alert to the other user that another user is attempting to implement the note-verify mode. While not illustrated, the idle screen 78 may include other user-selectable features, such a type feature where the user identifies the type of note desired for use with the note-verify mode, e.g., paper currency, check, money order, etc.

Block 88 relates to transmitting shutdown message upon detecting presence of the note to prevent other validators 12 or validator mechanisms 20, 22 from simultaneously operating according to the note-verify mode. The ability to prevent other validators or validator mechanism, particularly those in proximity to the first one being fed the note or those connected to a common networked infrastructure, may be beneficial in preventing user confusion when multiple users contemporaneously attempt to implement the note-verify mode. The shutdown message may be sufficient to prevent any subsequent validators from feeding or accepting notes, and thereby act as notification to the corresponding user that the note-verify mode has not been implement at the corresponding validator. Optionally, the shutdown message may prevent the other validators from processing any notes or to enable other validators to operate according to other modes besides the note-verify mode. The shutdown message may be transmitted locally within the safe 10 to prevent one of the other one of the mechanisms 20, 22 from operating and/or through a network interface to prevent other network-connected validators from operating.

Block 90 relates to the validator 12 escrowing the received note and assessing it to be one of valid and invalid in the manner described above with respect to the standard mode. Optionally, the verify-mode may deem notes to be valid or invalid according to other metrics than those utilized in the standard mode, e.g., the standard mode may be limited to processing only certain type of notes suitable for storage, such as paper currency and not checks, while the note-verify mode may perform other valid and invalid assessments for notes incapable of being stored in the safe 10 due to the notes being subsequently returned to the user regardless of validity. The note-verify mode may be operable with any type of note capable of being processed through the validator even if the safe is unable to store it. Blocks 92, 94 relate to the return of valid and invalid notes to the user, such as with delivery of the note following escrow back through the first interface. Block 96 relates to a verification message being generated to indicate whether the note was determined to be valid or invalid. The verification message be displayed via the HMI 40 or other display in communication with the safe and/or the verification message may be transmitted to a centralized network controller for the purposes of generating an audit for the note. Optionally, the verification message may be used to control to open a cashier till if valid and to prevent the cashier till from opening if invalid, which may be useful in providing cashiers with a secondary notification of validity.

FIG. 5 illustrates the verification message facilitating display of a valid screen 100 following a successful validation according to the note-verify mode in accordance with one non-limiting aspect of the present invention. The valid screen 100 may include the features described above with respect to FIG. 4 as well as a valid indicator 102 sufficient to alert the user of the valid determination, and optionally, a value for the note, e.g., $100 note. The valid screen 100 may optionally include a re-verify button 104 sufficient to automatically engage the note-verify mode for a subsequently submitted note, which may be beneficial in the event the validator 12 automatically defaults to the standard mode once the note-verify mode completes. FIG. 6 illustrates the verification message facilitating display of an invalid screen 106 following a successful validation according to the note-verify mode in accordance with one non-limiting aspect of the present invention. The invalid screen 106 may include the features described above with respect to FIGS. 4 and 5 as well as an invalid indicator 108 sufficient to alert the user of the invalid determination, which may optional identify the note as being non-genuine or incapable of being scanned. A cashier may review the valid/invalid screens prior to accepting the note as tender for a transaction, thereby providing an authenticity feedback prior to placing the note in the till or otherwise closing the transaction.

The foregoing standard and note-verify modes are predominately described with respect to processing a single note for verification purposes. This is done without necessarily intending to limit the scope and contemplation of the present invention as multiple notes may be processed prior to determining validity and/or validity may be determined individually for multiple notes passing through the validator 12 in succession, i.e., the valid and invalid screens may display serial numbers or other identifiers sufficient for individually identifying each note as being valid and/or invalid. The note-verify mode may verify a currency note as a valid note by extending the functionality of a bill validator for purposes of recognition and identification of the paper note currency inserted with the bill validator. A function may place the bill validator in a state known as escrow where the paper currency note can be read but not acted upon by the system. The function may then return the note without accepting the note to the presenting user and the function may read the state of the note and any potential value of said note. The function may then provide one of two responses to the user. An example of the first response is to inform the user via a user interface that the note could not be validated by the bill acceptor. An example of the second possible response would inform the user via a user interface that the note was validated and display the value of the note.

Figure 7:
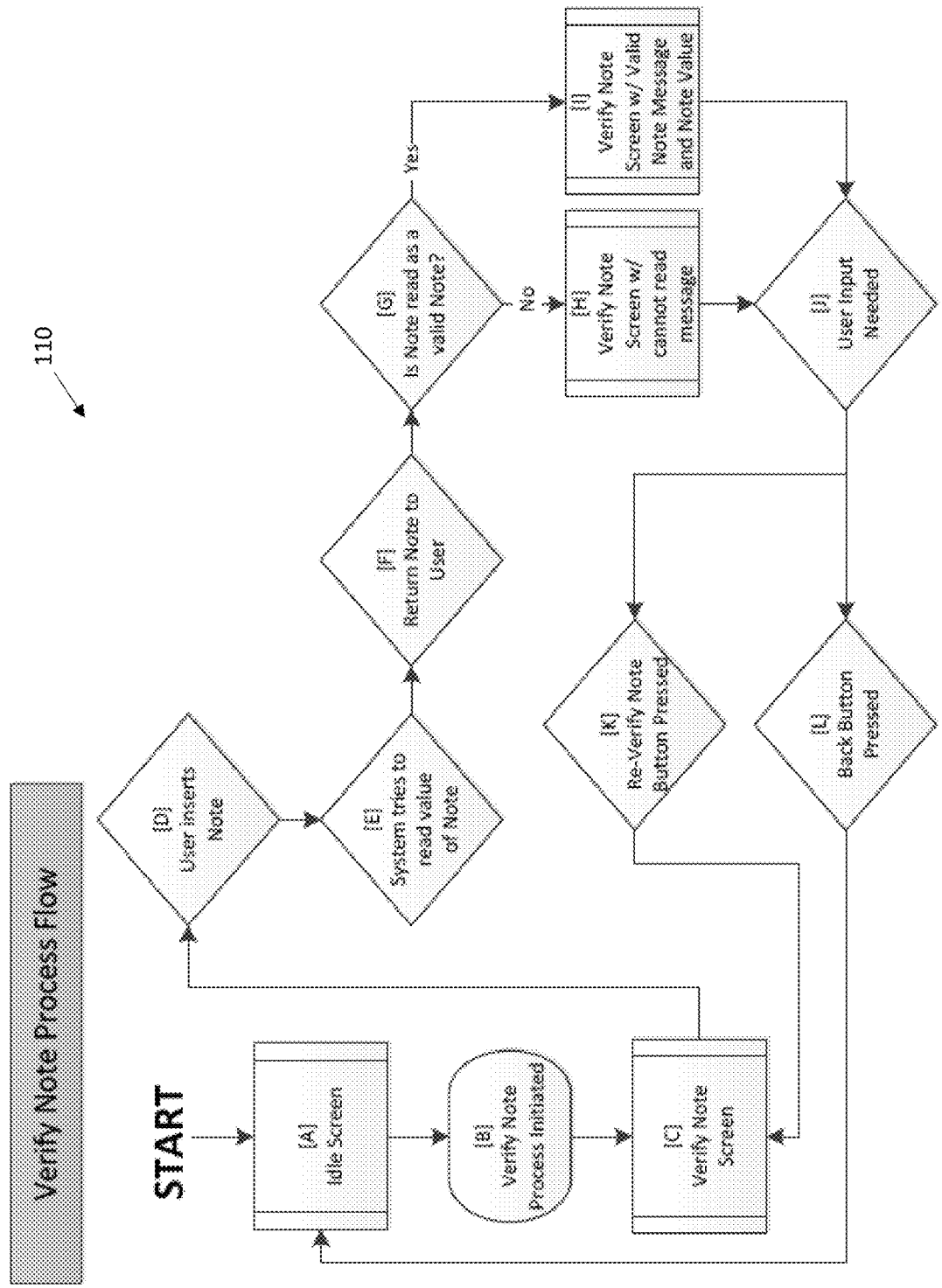
FIG. 7 illustrates a flowchart of a note verify process in accordance with one non-limiting aspect of the present invention.

FIG. 7 illustrates a flowchart 110 of a note verify process in accordance with one non-limiting aspect of the present invention. One non-limiting aspect of the present invention contemplates the note-verify feature providing a way for users of the system to use any note acceptor peripherals to validate a received note. Either the note is validated and the scanned value of the note is presented to the user, or the note cannot be identified and a warning message is presented to the user. This does not necessarily mean that the note is a counterfeit or otherwise a bad Note. Occasionally there is some kind of damage to the note either in parts missing, tearing, or markings on the note that can render it unreadable by a note acceptor. The process flow in FIG. 7 shows a number of steps in a builder (steps [A]-[L]). The sections below will define each of these steps.

Builder Step [A]—Idle Screen

The call to start the process will come from the idle screen. This is the logged out idle screen that the system is normally at when no users are logged in.

Builder Step [B]—Process Initiated

Once the process is initiated from the idle screen, the builder starts. It is not the responsibility of this builder to check to see if there are validators in the Local Node that the MCU is a part of. That logic is to be performed by the calling builder.

At this point in the process, any validators in the Local Node that are not part of a User Lock process should be enabled. As the Verify Note process does not accept any Money into the system or modify any Fund totals, any Note Acceptor in the Local Node system can be used no matter what Fund it is associated with.

Builder Step [C]—Verify Note Screen

There may be only one screen for the Verify Note process that is used throughout. This screen at this stage in the process flow only has two actions available for the user.

The first action is a 'Back' button that exits the process and takes the user back to the idle screen. There are no permissions or logic associated with the 'Back' button.

The second action available to the user is to insert a Note into one of the Note Acceptors that are active as part of the Verify Note process.

It is assumed that any Note Acceptors in any other state are known to the user and will continue to function in that other state while this process is going on.

Builder Step [D]—User Inserts a Note

As soon as a Note Acceptors recognizes that a Note has been inserted, all Note Acceptors associated with the Verify Note process should cease acceptance of Notes. Only the first Note put into a Note Acceptor should attempt to be validated.

Builder Step [E]—Validating the Note

After all other Note Acceptors have been disabled from accepting new Notes; the Note that was entered should now be in an escrow state in the Note Acceptor that it was inserted into. The state of the Note should be read from the Note Acceptor.

Builder Step [F]—Return Note to User

At this point the note should be rejected no matter the outcome of the validation process. The Verify Note process should never stack or accept a Note past the point of escrow.

Builder Step [G]—User Inserts a Note

Here the state of the Note that was read should be examined. A decision point exists here that is based on whether the Note was read as valid or not. This decision point affects the next two steps.

Builder Step [H]—Verify Note Screen with Warning

At this point in the process a Note has been read and it was unable to be validated by the Note Acceptor. The user has two options at this point:

Press the 'Back' button which will exit this process and take the user back to the idle screen. Again, there are no permissions or logic associated with the 'Back' button.

Press the 'Re-Verify Note' button. When pressed, the process flow will revert back to step [B] and continue from there.

Builder Step [I]—Verify Note Screen with Valid Note message and Note value been read and it was read and validated by the Note Acceptor. The user has two options at this point in the process:

Press the 'Back' button which will exit this process and take the user back to the idle screen. Again, there are no permissions or logic associated with the 'Back' button.

Press the 'Re-Verify Note' button. When pressed, the process flow will revert back to step [B] and continue from there.

Builder Step [J]—User Input Needed

This step just indicates that the process is dependent on the user making a selection at this point. The process will not continue until a selection is made.

Builder Step [K]—'Re-Verify' Button Press

Here the user has selected the 'Re-Verify' button. This event in analogous to starting the process from the beginning and the process flow should start again at step [B].

Builder Step [L]—'Back' Button Press

Here the user has selected the 'Back' button. This event exits this process and takes the user back to the idle screen and completes the Verify Note process.

Additional Verify Note Module Considerations

The Verify Note process has a few additional considerations that need to be taken into account during the development of the module. These considerations are defined in the sections below.

Verify Note Process Error Handling

No specific error handling logic is needed for this process. The first Note Acceptor that registers that a Note has been submitted for validation is the one that will be used for the validation process. This will eliminate conditions where simultaneous notes are put into different Note Acceptors to try and game the system.

Verify Note Process Accounting

The Verify Note process is not associated with any Funds or Fund Totals. At no point in the Verify Note process should any Note ever be stacked in a Note Acceptor. At no point in the Verify Note process should any totals be queried or modified.

Verify Note Process Auditing

Every time a Note is read for validation in the Verify Note process an audit is created in the System Audit. This audit record will contain the default audit timestamp. Because no user login precedes running the Verify Note process the system has no way of knowing what user is performing the process, therefore the user for the audit is the 'System'. The audit record will contain the results of the validation and, if valid, the value of the validated Note. The specific audit data can be found in Appendix E—Ascent Platform Audit Detail.

Verify Note Process Screen Timeouts

The screens used in the Verify Notes process will have associated screen timeouts. These screen timeouts will be settings based, and reflect the global settings 'screen_timeout_active' and 'screen_timeout_time'. If the setting 'screen_timeout_active' is set to 'Y' then all screens in this process need to timeout after x seconds, with x being an integer value represented in the setting 'screen_timeout_time'. If 'screen_timeout_active' is set to 'N' then no screen timeouts will occur in this process.

The screen timeout is a timer that resets on any user interaction with the system. This could be in the form of touch on a touchscreen, or inserting a Note into an activated Note Acceptor, or causing a sensor to trigger. The latter could be something like closing a Vault door. Upon reset, the timer will start counting seconds again. If the timer reaches the 'screen_timeout_time' then the screen timeout action occurs. The screen timeout action for the Verify Note process is to close the process and pass navigation back to the idle screen.

Note that if a screen timeout occurs during the part of the process where any Note Acceptors are in use, any Note Acceptors associated with this Verify Note process should be disabled and placed back into an idle state.

Verify Note Process Help Button

In the top navigation bar on the screen used for the Verify Note process, there is a circular button with a '?' inside it. That button will bring up the Help overlay for this module. No matter when the button is pressed during this process, the help overlay will display the same instructions for the process and will not change depending on what part of the process the user is in. The Help overlay will contain 2 buttons, a 'Close' button and a 'Print' button. The 'Print' button can be used to print a copy of the help navigation. The 'Close' button can be used to close the Help overlay and continue on in the Verify Note process.

Note that the Help section is referred to as an overlay meaning that it will ride on top of the existing screen with the underlying process still ongoing. Therefore screen timeouts will also apply to the Help overlay as well as the underlying screen.

Verify Note Process Navigation Cost

The navigation cost for an expected run through the Verify Note Process alone is $1+t^1+1+t^2+1$. The first 1 indicates the button press to start the process. The value of $t^1$ is the amount of time for a user to insert a Note into a Note Acceptor. The second 1 indicates an estimated length of time for the Note Acceptor to read the Note and then pass the Note back out of the Note Acceptor. The value of $t^2$ is the amount of time for a user to take the note and read the results of the verification process onscreen. The final 1 denotes the single button press to complete the process.

Consolidating the navigation cost down to $3+t1+t2$ gives a condensed cost. Assuming a trained user of the system taking anywhere from 1-10 seconds for both t1 and t2, we get a theoretical best-worst case navigation cost for a trained user of 5-23 seconds to complete the Verify Note process.

There is master audit data stored for every audit in the system. This master data comprises the user information for each audit, a timestamp, an audit type, and a master data field that stores the xml for the master audit. The master audit data also stores a master id which is an auto-incrementing field that stores a consecutive counting number that indicates the position of the audit against all others in the system. This piece of data is even more important than the timestamp in that it represents an ordering of the data sequentially and will exist even if the realtime clock in the system is not operating correctly or is tampered with.

Master Audit XML Format

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A safe comprising:
a secure storage area for storing notes; and
a validator having a first head and a second head configured to facilitate implementing a validation process sufficient for validating notes, the validator being configured to facilitate:
i) operating according to a standard mode whereby both of the first head and the second head are permitted to direct notes determined by the validation process to be valid to the secure storage area for safekeeping;
ii) operating according to a note-verify mode whereby one but not both of the first head and the second head are permitted to direct notes determined by the validation process to be either of valid and invalid back to the user; and
iii) escrowing notes in both of the standard mode and the note-verify mode such that an entirety of the note is at least temporarily out-of-sight within the validator prior to being subsequently directed to one of the user or the secure storage area
a network interface facilitates signaling with a point-of-sale (POS) system having a till used by a cashier to facilitate closing transactions when notes are placed therein; and
wherein operating according to the note-verify mode includes:
i) signaling through the network interface to permit opening of the till when notes determined by the validation process are valid, thereby enabling the cashier to place the notes determined to be valid within the till for purposes of closing related transactions; and
ii) signaling through the network interface to prevent opening of the till when notes determined by the validation process are invalid, thereby preventing the cashier from placing the notes determined to be invalid within the till for purposes of preventing closing of related transactions.

2. The safe of claim 1 wherein the note-verify mode includes the validator generating a verification message for indicating each note directed back to the user as one of valid and invalid as determined by the validation process.

3. The safe of claim 2 wherein the note-verify mode includes the validator indicating within the verification message a value for each note determined to be valid and for each note determined to be invalid.

4. The safe of claim 2 further comprising a display operable with the validator to facilitate display of the verification message to the user, including displaying a warning for each note determined to be invalid.

5. The safe of claim 2 wherein the POS system displays of a warning for each note determined to be invalid.

6. The safe of claim 1 further comprising:
a touch-screen display operable to interface a note-verify button with the user, the note-verify button operable for controlling the validator between the standard mode and the note-verify mode;
operating the standard mode such that notes of paper currency and not checks are determinable by the validation process; and operating the note-verify mode such that notes of paper currency and checks are determinable by the validation process.

7. The safe of claim 1 wherein the validator directs each invalid note to the secure storage area for safekeeping when operating according to the standard mode.

8. The safe of claim 1 wherein the validator includes a first mechanism for feeding notes through the first head and a second mechanism for feeding notes through the second head, the first mechanism and the second mechanism being configured to independently and simultaneously feed notes when the validator is operating according to the standard mode and to shut down in response to receipt a shutdown message or other action when prevented from implementing the validation process according to the note-verify mode.

9. The safe of claim 1 wherein the validator includes a first mechanism for feeding notes through the first head and a second mechanism for feeding notes through the second head and shuts down one of the first and second mechanisms when operating according to the note-verify mode such that only one of the first and second mechanisms is operable to feed notes as part of the verification process.

10. The safe of claim 9 wherein the validator shuts down the first mechanism when operating according to the note-verify mode if the second mechanism is fed a note before the first mechanism is fed a note and wherein the validator shuts down the second mechanism when operating according to the note-verify mode if the first mechanism is fed a note before the second mechanism is fed a note.

11. A non-transitory computer-readable medium having a non-transitory instructions operable with a plurality of validators to facilitate electronically validating notes fed from a user, the non-transitory instructions being sufficient for:
performing a standard verification whereby a first validator of the plurality of validators escrows and assesses notes to be at least one of valid and invalid and thereafter automatically directs valid notes for storage;
performing a note-verify verification where the first validator escrows and assesses notes to be at least one of valid and invalid and thereafter automatically returns both valid and invalid notes to the user; and
transmitting a shutdown message to the first validator to prevent the first validator from operating according to the note-verify mode when a second validator of the plurality of validators switches from the standard mode to the note-verify mode.

12. The non-transitory computer-readable medium of claim 11 wherein the non-transitory instructions are sufficient for:
facilitating display of a verification message when operating according to the note-verify mode, the verification message indicating whether a note is valid or invalid; and
transmitting a control message to the second validator to automatically return the second validator to the standard mode upon expiration of a timer set following display of the verification message.

13. The non-transitory computer-readable medium of claim 12 wherein the non-transitory instructions are sufficient for displaying a value of the note as part of the verification message if the note is valid and for displaying a warning if the note is invalid.

14. The non-transitory computer-readable medium of claim 11 wherein the non-transitory instructions are sufficient for generating the shutdown to prevent a feed mechanism of the first validator from feeding or accepting notes.

15. The non-transitory computer-readable medium of claim 14 wherein the non-transitory instructions are sufficient for automatically directing invalid notes for storage when performing the standard verification.

16. A system comprising:
a safe including:
i) a secure storage area for storing paper bills; and
ii) a bill validator configured to mechanically feed the paper bills through either of a first head and a second head operable to scan the paper bills as part of a verification process;
iii) a non-transitory computer-readable medium having a plurality of non-transitory instructions executable with a processor to facilitating operating the bill validator to execute the verification process according to a note-verify mode where the bill validator:
(1) escrows a first paper bill of the paper bills through the first head;
(2) determines the first paper bill to be at least on of valid and invalid;
(3) returns the first paper bill to the user; and
(4) prevents the second head from escrowing a second paper bill of the papers bills until the first bill validator ceases the note-verify mode;
iv) wherein the plurality of non-transitory instructions facilitate operating the bill validator to execute the verification process according to a standard mode where the bill validator:
(1) escrows a third paper bill of the paper bills through one of the first head and the second head without contemporaneously preventing the other one of the first head and the second head from escrowing a fourth paper bill of the paper bills;
(2) determines the third paper bill to be at least on of valid and invalid; and
(3) feeds the third paper bill when determined to be valid to the secure storage area
the bill validator is operable between the note-verify mode and the standard mode as a function of a single actuation of a note-verify button; and
the bill validator automatically returns the first head from the note-verify mode to the standard mode upon expiration of a timer set from the single actuation of the note-verify button.

17. The system of claim 16 further comprising:
a point-of-sale (POS) system including a till for use with a cashier;
wherein the safe includes:
i) a network interface for communicating with the POS system; and
ii) the plurality of non-transitory instructions facilitate operating the bill validator to:
(1) shut down a feed mechanism of the second head to prevent the second head from escrowing the second paper bill;
(2) control the till through the network interface to permit the cashier to open the till when the first bill is valid; and
(3) control the till through the network interface to prevent the cashier from opening the till when the first bill is invalid.

* * * * *